United States Patent
Felter et al.

(10) Patent No.: US 7,783,910 B2
(45) Date of Patent: Aug. 24, 2010

(54) METHOD AND SYSTEM FOR ASSOCIATING POWER CONSUMPTION OF A SERVER WITH A NETWORK ADDRESS ASSIGNED TO THE SERVER

(75) Inventors: Wesley M. Felter, Austin, TX (US); Charles R. Lefurgy, San Marcos, TX (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 11/693,886

(22) Filed: Mar. 30, 2007

(65) Prior Publication Data
US 2008/0244281 A1 Oct. 2, 2008

(51) Int. Cl.
*G06F 1/00* (2006.01)
(52) U.S. Cl. ...................... 713/340; 713/300
(58) Field of Classification Search ............. 713/300, 713/340
See application file for complete search history.

(56) References Cited

U.S. PATENT DOCUMENTS

| | | | |
|---|---|---|---|
| 6,785,827 B2 * | 8/2004 | Layton et al. | 713/300 |
| 7,069,345 B2 * | 6/2006 | Shteyn | 709/250 |
| 7,099,934 B1 * | 8/2006 | Ewing et al. | 709/223 |
| 7,152,174 B2 * | 12/2006 | Needham et al. | 713/340 |
| 7,171,461 B2 * | 1/2007 | Ewing et al. | 709/223 |
| 7,634,671 B2 * | 12/2009 | Frietsch et al. | 713/300 |
| 2007/0276548 A1 * | 11/2007 | Uzunovic et al. | 700/297 |
| 2008/0141048 A1 * | 6/2008 | Palmer et al. | 713/300 |
| 2009/0222679 A1 * | 9/2009 | Lee | 713/300 |

OTHER PUBLICATIONS

"IBM DPI PDU+", IBM Powerware, p. 1, retrieved Mar. 28, 2007 http://www.powerware.com/ibm/us/products/pdu_plus.asp?CC=1.
"DPI C13 PDU+, DPI C19 PDU+, and DPI C19 3-phase PDU+ Installation and Maintenance Guide",First Edition (May 2006) IBM,pp. 1-74 http://lit.powerware.com/II_download.asp?file=40k9635.pdf.

* cited by examiner

*Primary Examiner*—Chun Cao
(74) *Attorney, Agent, or Firm*—Yee & Associates, P.C.; Libby Z. Toub

(57) ABSTRACT

A system for associating power consumption with a network address. Network traffic is inspected to determine network addresses. The network addresses are assigned to one or more servers. A power output of a plurality of power outlets is measured to determine a power consumption of the one or more servers connected to the plurality of power outlets. The network addresses assigned to the one or more servers is associated with the power consumption of the one or more servers. A total power consumption is calculated for the one or more servers having an association of network addresses with power consumption. Then, the total power consumption is recorded for the one or more servers in a table and a user is provided access to the table.

18 Claims, 13 Drawing Sheets

DATA TABLES 1000

PNDU #1 DATA TABLE 1002

| OUTLET | ENERGY USED (kWh) | POWER (W) | MAC | IP | AGE (SECONDS) SINCE LAST UPDATE TO IP |
|---|---|---|---|---|---|
| #1 _1020_ | 30000 | 400 | AA:BB:CC:DD:EE:FF | 9.3.61.2 | 2 |
|  |  |  |  | 9.3.61.3 | 30 |
|  |  |  | 11:22:33:44:55:66 | 9.3.61.4 | 55 |
| #2 _1022_ | 50000 | 300 | 11:aa:22:bb:33:ff | 9.3.61.100 | 1 |

PNDU #2 DATA TABLE 1004

| OUTLET | ENERGY USED (kWh) | POWER (W) | MAC | IP | AGE (SECONDS) SINCE LAST UPDATE TO IP |
|---|---|---|---|---|---|
| #1 _1024_ | 31000 | 410 | 99:88:77:66:55:44 | 9.3.61.10 | 100 |
| #2 (NOT CONNECTED) | 0 | 0 |  |  |  |

SMS DATA TABLE 1006

| SERVER | ENERGY USED (kWh) | POWER (W) | OUTLET | ENERGY | POWER (W) | MAC | IP | DATA AGE |
|---|---|---|---|---|---|---|---|---|
| #1 _1032_ | 61000 | 810 | PNDU#1: OUTLET #1 _1020_ | 30000 | 400 | AA:BB:CC:DD:EE:FF | 9.3.61.2 | 2 |
|  |  |  |  |  |  |  | 9.3.61.3 | 30 |
|  |  |  |  |  |  | 11:22:33:44:55:66 | 9.3.61.4 | 55 |
|  |  |  | PNDU#2: OUTLET #1 _1024_ | 31000 | 410 | 99:88:77:66:55:44 | 9.3.61.10 | 100 |
| #2 | 50000 | 300 | PNDU#1: OUTLET #2 | 50000 | 300 | 11:aa:22:bb:33:ff | 9.3.61.100 | 1 |

*FIG. 10*

METHOD AND SYSTEM FOR ASSOCIATING POWER CONSUMPTION OF A SERVER WITH A NETWORK ADDRESS ASSIGNED TO THE SERVER

BACKGROUND OF THE INVENTION

1. Field of the Invention

The present invention relates generally to an improved data processing system. More specifically, the present invention is directed to a computer implemented method, system, and computer usable program code for associating a server network address with the power consumption of a server using that network address.

2. Description of the Related Art

A computer system in a network, which is shared by multiple users, is known as a server. Servers come in all sizes from x86-based PCs to IBM® mainframes. Typically, in large businesses or enterprises, servers often reside in racks in a datacenter.

A large datacenter may have thousands of rack servers. A single rack may contain multiple servers stacked one above the other, which consolidates network resources and minimizes the required floor space. Also, the rack server configuration simplifies cabling among network components.

However, given a datacenter of rack-mounted servers, it is currently difficult to associate the power consumption of each of the rack-mounted servers with their respective network identity or address. Today, some servers may have a built-in power measurement and another device may be used to scan the network to find these servers. But, this method is still not ideal because the power consumption is measured out-of-band and the device has no way to identify the network address the operating system is using. Typically, this out-of-band power measurement is read over a "management" network utilizing a different network address from the network address used by the operating system or hypervisor on the "data" network. Because power measurement data is read over the management network address, which is unrelated to the data network address, a server's power consumption data may be obtained without knowing the server's network address.

Manually performing this task is labor-intensive and error prone for large clusters of servers because the power outlet used by each server and the network address of each server must be manually recorded by an individual. In addition, each time a network address is re-assigned in the server cluster or when the cluster is upgraded, this information needs to be manually updated. Further, a large number of wires are used in these clusters of servers, which may make it difficult for an individual to accurately follow the wires to record the information. Furthermore, in redundant systems the number of wires is increased.

Therefore, it would be beneficial to have an improved computer implemented method, system, and computer usable program code for associating the power consumption of one or more rack servers with the one or more rack servers' respective network addresses.

SUMMARY OF THE INVENTION

Illustrative embodiments provide a computer implemented method, system, and computer usable program code for associating power consumption with a network address. Network traffic is inspected to determine network addresses. The network addresses are assigned to one or more servers. A power output of a plurality of power outlets is measured to determine a power consumption of the one or more servers connected to the plurality of power outlets. The network addresses assigned to the one or more servers is associated with the power consumption of the one or more servers. A total power consumption is calculated for the one or more servers having an association of network addresses with power consumption. Then, the total power consumption is recorded for the one or more servers in a table and a user is provided access to the table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is an exemplary illustration of data tables in accordance with an illustrative embodiment;

DETAILED DESCRIPTION OF THE PREFERRED EMBODIMENT

Figure 1:
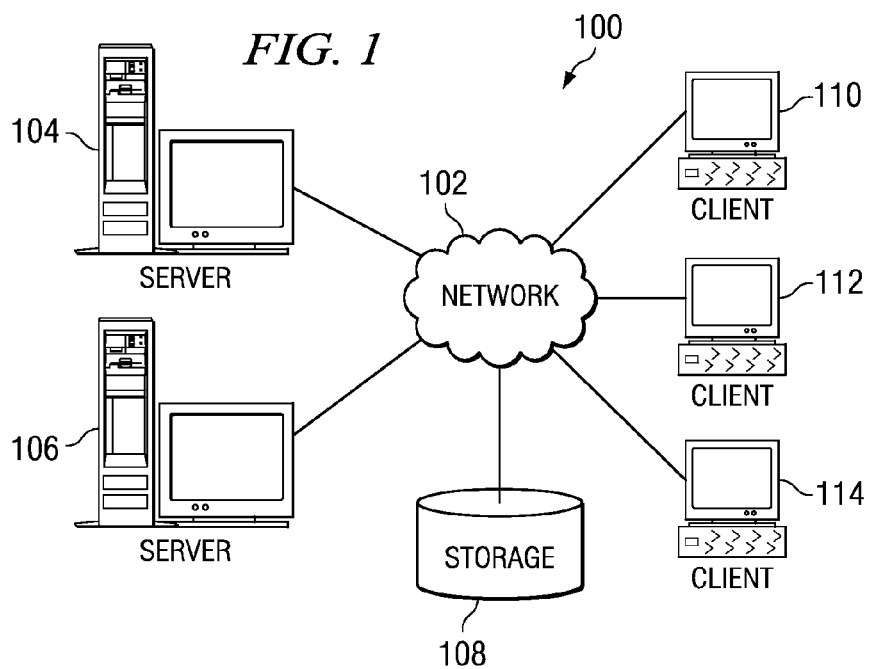
FIG. 1 is a pictorial representation of a network of data processing systems in which illustrative embodiments may be implemented.
Figure 2:
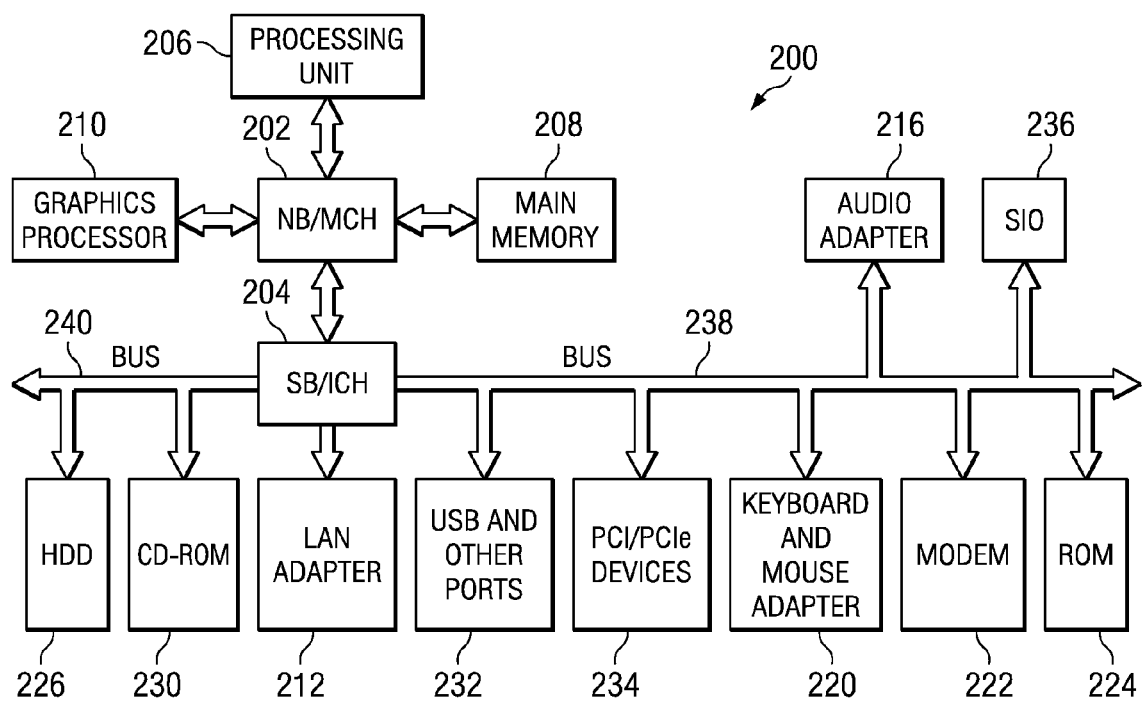
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between computers and other various devices connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 also connect to network 102. Clients 110, 112, and 114 may, for example, be personal computers or network computers. In the depicted example, server 104 provides data, such as boot files, operating system images, and applications to clients 110, 112, and 114. Clients 110, 112, and 114 are clients to server 104 in this example. Further, server 104 and server 106 may be rack servers in a datacenter. Furthermore, network data processing system 100 also may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Storage 108 may, for example, be a data repository or database. The data contained within storage 108 may, for example, include all data necessary for illustrative embodiments to associate the power consumption of one or more rack servers with a respective network address of the one or more rack servers. Storage 108 may, for example, store this data in one or more tables. However, it should be noted that storage 108 may store this data in either a structured format or an unstructured format.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and may even be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204 and audio adapter 216, keyboard and mouse adapter 220, modem 222, read only memory (ROM) 224, universal serial bus (USB) and other ports 232, and PCI/PCIe devices 234 are coupled to SB/ICH 204 through bus 238, and hard disk drive (HDD) 226 and CD-ROM 230 are coupled to SB/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may, for example, use an integrated drive electronics (IDE) or serial advanced technology attachment (SATA) interface. A super I/O (SIO) device 236 may be coupled to SB/ICH 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to al multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in NB/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for associating power consumption with a network address. Network traffic is inspected to determine network addresses. The network addresses are assigned to one or more servers. A power output of a plurality of power outlets is measured to determine a power consumption of the one or more servers connected to the plurality of power outlets. The network addresses assigned to the one or more servers is associated with the power consumption of the one or more servers. A total power consumption is calculated for the one or more servers having an association of network addresses with power consumption. Then, the total power consumption is recorded for the one or more servers in a table and a user is provided access to the table.

Illustrative embodiments utilize a power network distribution unit (PNDU) and a system management software (SMS) to perform the above-described steps. The PNDU effectively combines the functions of a network switch and a power distribution unit. A server plugs into a network port and a correspondingly numbered power outlet on the PNDU. As a result, the PNDU provides network access and power for connected servers in a rack. In addition, the PNDU provides the ability to snoop or inspect network traffic and measure the power consumption of each server connected to the PNDU. Furthermore, the PNDU provides the ability to associate the snooped network addresses with particular power outlets in the PNDU.

Internally, the PNDU has a microprocessor, with possibly a network processor or field programmable gate array (FPGA) that monitors or snoops outbound traffic on each network interface for media access control (MAC) and internet protocol (IP) addresses and associates the network addresses with a corresponding power outlet. The FPGA is a semiconductor device containing programmable logic components and programmable interconnects. The programmable logic components may be programmed to duplicate the functionality of basic logic gates. A hierarchy of programable interconnects allow the programmable components of the FPGA to be interconnected as needed by a system designer. These programmable components and interconnects may be programmed after manufacture by the system designer so that the FPGA may perform whatever logical function is needed. Hence, the term "field programmable," which means the FPGA is programmable in the field.

The MAC address is a unique identifier attached to most network adapters. The MAC address is a number that acts like a name for a particular network adapter. For example, network adapters for two different computers will have different MAC addresses. The IP address is a unique address that identifies a specific computer or other network device, such as a router, fax, or printer, within a network.

The SMS scans the network to find each PNDU. The SMS may, for example, be an IBM Director, which is a product available from International Business Machines. The SMS queries each PNDU to discover chains of PNDUs that represent server racks. The SMS periodically downloads power consumption and network address information from each PNDU to establish a database. The database may, for example, be searched by a network address to determine a particular server's power consumption. In addition, a server's network address may be easily located in the database by looking up the server's PNDU number and the server's respective power outlet number on the PNDU.

Thus, a business or enterprise utilizing illustrative embodiments may not require manual effort to associate power outlets with network addresses of servers. In addition, illustrative embodiments may vastly reduce the possibility of errors in recording this association information. Previously, errors may have been due to careless wiring. However, illustrative embodiments reduce this possibility of error by assuming simple wiring rules. Illustrative embodiments require each server to attach a network cable and power cable to the same numbered network and power ports. Consequently, illustrative embodiments allow an individual to easily see any obvious wiring errors.

Figure 3:
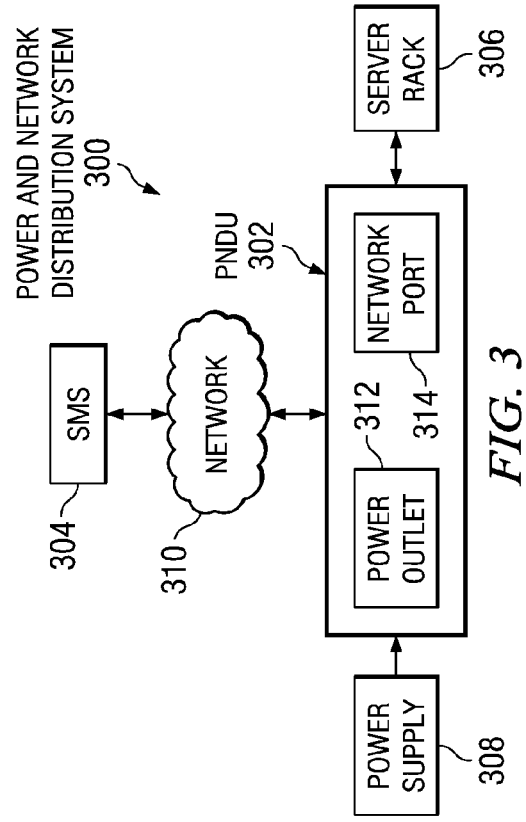
FIG. 3 is an exemplary illustration of a power and network distribution system in accordance with an illustrative embodiment.

With reference now to FIG. 3, an exemplary illustration of a power and network distribution system is depicted in accordance with an illustrative embodiment. Power and network distribution system 300 may, for example, be implemented in network data processing system 100 in FIG. 1. Power and network distribution system 300 includes PNDU 302, SMS 304, server rack 306, power supply 308, and network 310.

PNDU 302 combines the function of a power distribution unit with the function of a network switch. A power distribution unit distributes power to rack-mount servers. A network switch is a small hardware device that joins multiple computers together within a network. A network switch is capable of inspecting data packets as the data packets are received, determining the source and destination device of each data packet, and forwarding the data packets to the appropriate device. By delivering each data packet only to the connected device it was intended for, a network switch conserves network bandwidth.

PNDU 302 provides network access and a power supply for one or more servers. Moreover, PNDU 302 internally inspects, or snoops, network addresses on each network port and associates the network addresses with a same numbered power outlet as the network port. Furthermore, PNDU 302 includes a simple wiring scheme. In other words, PNDU 302 requires that a server attach a network and power cable to a same numbered network and power port.

PNDU 302 includes power outlet 312 and network port 314. Power outlet 312 supplies power to server rack 306. Network port 314 supplies network access to server rack 306. Of course, it should be noted that power outlet 312 and network port 314 may represent a plurality of power outlets and network ports for PNDU 302. Also, it should be noted that PNDU 302 may represent a plurality of PNDUs.

PNDU 302 may use a simple network management protocol (SNMP) that forms part of an internet protocol suite as defined by the Internet Engineering Task Force (IETF). SNMP is used by network management systems to monitor network-attached devices for conditions that warrant administrative attention. SNMP consists of a set of standards for network management, which includes an application layer protocol, a database schema, and a set of data objects.

SMS 304 is a software application that manages PNDU 302. SMS 304 may, for example, be located in a remote data processing system, such as client 110 in FIG. 1, or in a control console for a datacenter. Alternatively, SMS 304 may be located within PNDU 302, itself.

SMS 304 scans network 310 to find all PNDUs connected to network 310. Also, SMS 304 displays data collected from each of the PNDUs connected to network 310 in a display device for users to view. SMS 304 may be provided with a range of network addresses that server rack 306 utilizes. SMS 304 periodically probes server rack 306 on a pre-determined basis to determine which server is associated with each network address. For example, SMS 304 may "ping" each provided network address so that PNDU 302 may inspect or snoop the network packets to and from the server associated with each pinged network address.

However, illustrative embodiments may continue to work even if a server does not respond to a ping from SMS 304. For example, if there has not been any network traffic from a server for a pre-determined period of time, then illustrative embodiments will cause the nearest router to address resolution protocol (ARP) that server. In an alternative illustrative embodiment, PNDU 302, itself, issues the ARP to the unresponsive server. ARP is a method for finding a host's hardware address when only its network layer address is known. ARP is primarily used to translate IP addresses to Ethernet MAC addresses. The server must respond to the ARP. As a result, PNDU 302 sees the server's ARP response.

SMS 304 may probe network 310 to discover chains of PNDUs. SMS 304 may display a chain of PNDUs to a user as a unit, which may be named or identified by a head PNDU MAC address. Also, the head PNDU MAC address may be used to identify a server rack.

SMS 304 polls a PNDU chain for redundant PNDUs, power consumption on each power outlet, and network addresses associated with each power outlet. A user may query SMS 304 to locate a particular server, which the query may return data, such as a head PNDU MAC address, a PNDU MAC address, and a power outlet number, associated with that particular server. In addition, SMS 304 may list all servers in the rack or PNDU chain. Further SMS 304 may power on or power off a particular server, record energy/power consumption for a particular server given a MAC or IP address, or energy/power consumption for a server rack or PNDU chain. Power consumption for redundant power outlets may either be summed in a PNDU chain upon query of SMS 304 or may be performed by SMS 304 after collecting per PNDU data.

Server rack 306 includes one or more servers. For example, server rack 306 may include server 104 and server 106 in FIG. 1. In addition, server rack 306 may represent a plurality of server racks in, for example, a datacenter. Each of the one or more servers in server rack 306 has network and power cables that insert into power and network ports, such as power outlet 312 and network port 314, which have corresponding numbers.

Power supply 308 is a power source for PNDU 302. PNDU 302 uses power supply 308 to provide power to the one or more servers in server rack 306 via power outlet 312. Power supply 308 may be any type of power source that meets the power requirements of PNDU 302. In addition, power supply 308 may represent a plurality of power sources.

Network 310 may, for example, be network 102 in FIG. 1. Network 310 is the medium used to provide communication for power and network distribution system 300. PNDU 302 provides access to network 310 for the one or more servers in server rack 306 via network port 314.

Figure 4:
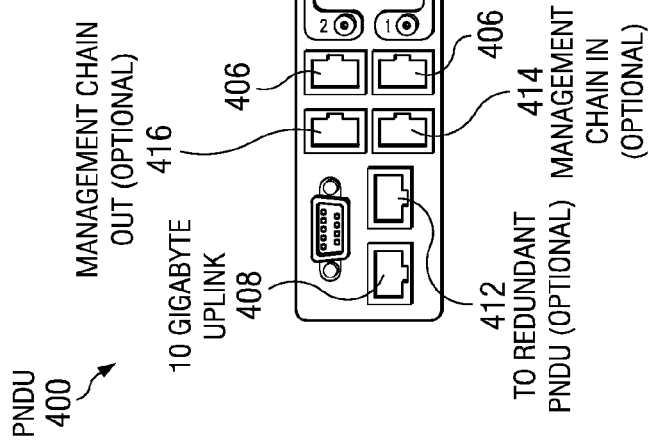
FIG. 4 is an exemplary illustration of a power network distribution unit in accordance with an illustrative embodiment.

With reference now to FIG. 4, an exemplary illustration of a power network distribution unit is depicted in accordance with an illustrative embodiment. PNDU 400 may, for example, be PNDU 302 in FIG. 3. PNDU 400 includes power socket 402, power outlets 404, network ports 406, network port 408, and MAC address 410. Optionally, PNDU 400 also includes redundant PNDU port 412, management chain in port 414, and management chain out port 416.

Power socket 402 is a socket for PNDU 400 to receive power from a power circuit or an external power source, such as, for example, power supply 308 in FIG. 3. Power outlets 404 may, for example, be power outlet 312 in FIG. 3. Power outlets 404 provide power to one or more servers in a server rack, such as, for example, server rack 306 in FIG. 3. Each server in the server rack connects a power cable to PNDU 400 via power outlets 404. Each of the power outlets 404 have a corresponding number associated with it. In this particular example, the corresponding numbers for power outlets 404 are 1-6.

Network ports 406 may, for example, be network port 314 in FIG. 3. Network ports 406 provide access to a network, such as, for example, network 310 in FIG. 3. Network ports 406 may, for example, be one gigabyte (Gb) downlinks to the one or more servers in the server rack. Each server in the server rack connects a network cable to PNDU 400 via network ports 406. Each of the network ports 406 have a corresponding number associated with it. In this particular example, the corresponding numbers for network ports 406 also are 1-6. In other words, each numbered downlink network port has a correspondingly numbered power outlet port.

However, even though in this particular example PNDU 400 includes six power outlets and six corresponding network ports, illustrative embodiments are not limited to such. Illustrative embodiments may include more or fewer power outlets and network ports. Further, illustrative embodiments may include any ratio of power outlets to network ports.

Further, it should be noted that even though the PNDUs illustrated in FIGS. 4-9 are a 1U device, illustrative embodiments may utilize a PNDU as a 2U device. In other words, illustrative embodiments may place each data network port in the 2U directly above each corresponding power outlet in the 1U. By using a 2U PNDU, the visual associations between corresponding network ports and power outlets is even easier for a system designer. However, it should be noted that a 1U PNDU is preferred for space reasons.

Network port 408 is a network port that connects PNDU 400 to the network. Network port 408 may, for example, be a ten Gb uplink to the network. The network in this particular example is a LAN.

MAC address 410 is the MAC address of PNDU 400. MAC address 410 identifies PNDU 400 in the LAN. In this particular example, MAC address 410 for PNDU 400 is 12:34:56:AB:CD:EF, which is a unique identifier.

Redundant PNDU port 412 is a port that provides communication between PNDU 400 and a redundant PNDU. As noted above, redundant PNDU port 412 is an optional feature. In other words, PNDU 400 is not required to have a redundant PNDU associated with it, but may have one if the system designer so desires.

Furthermore, management chain in port 414 and management chain out port 416 also are optional features for PNDU 400. Management chain in port 414 and management chain out port 416 provide a management communication channel for other PNDUs that may be connected to PNDU 400 in a chain. However, it should be noted that illustrative embodiments do not require PNDU 400 to be in a chain of PNDUs.

Figure 5:
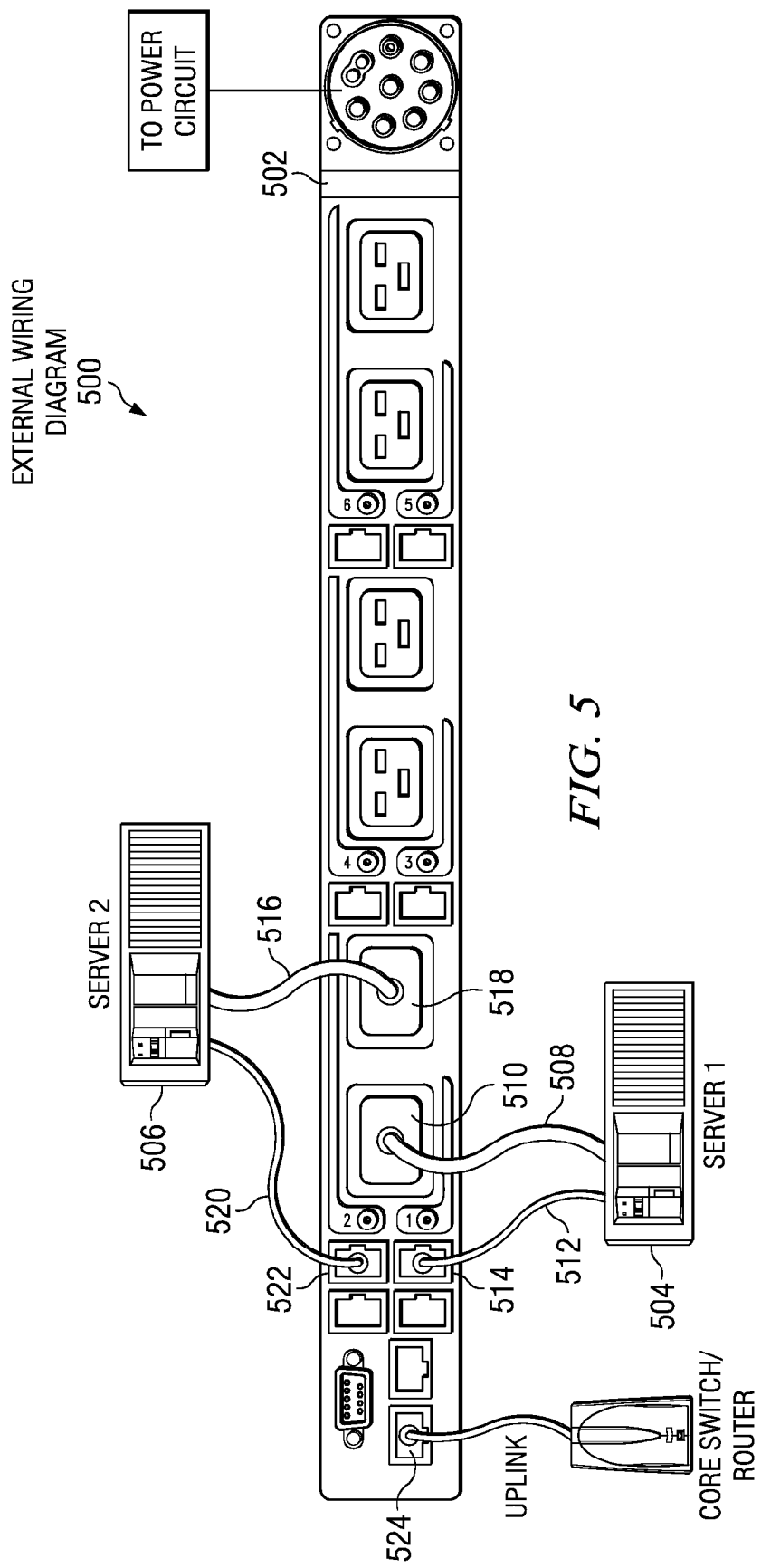
FIG. 5 is an exemplary external wiring diagram for a power network distribution unit in accordance with an illustrative embodiment.

With reference now to FIG. 5, an exemplary external wiring diagram for a power network distribution unit is depicted in accordance with an illustrative embodiment. External wiring diagram 500 includes PNDU 502, server 504, and server 506. PNDU 502 may, for example, be PNDU 400 in FIG. 4. Server 504 and server 506 may, for example, be server 104 and server 106 in FIG. 1, respectively. In addition, server 504 and server 506 may, for example, be servers within a server rack, such as server rack 306 in FIG. 3.

In this particular example, server 504 connects power cable 508 to power outlet 510 and network cable 512 to network port 514. It should be noted that power outlet 510 and network port 514 have corresponding numbers, which in this example is the number "1." Server 506 connects power cable 516 to power outlet 518 and network cable 520 to network port 522.

It should be noted that power outlet 518 and network port 522 also have corresponding numbers, which in this particular example is the number "2." Consequently, illustrative embodiments provide a simple wiring scheme for a PNDU to provide power and network access for each connecting server.

Network uplink port 524 provides an uplink to a network, such as, for example, network 310 in FIG. 3, for PNDU 502. As a result, server 504 and server 506 have access to the network via PNDU 502 via network downlink ports 514 and 522, respectively.

Figure 6:
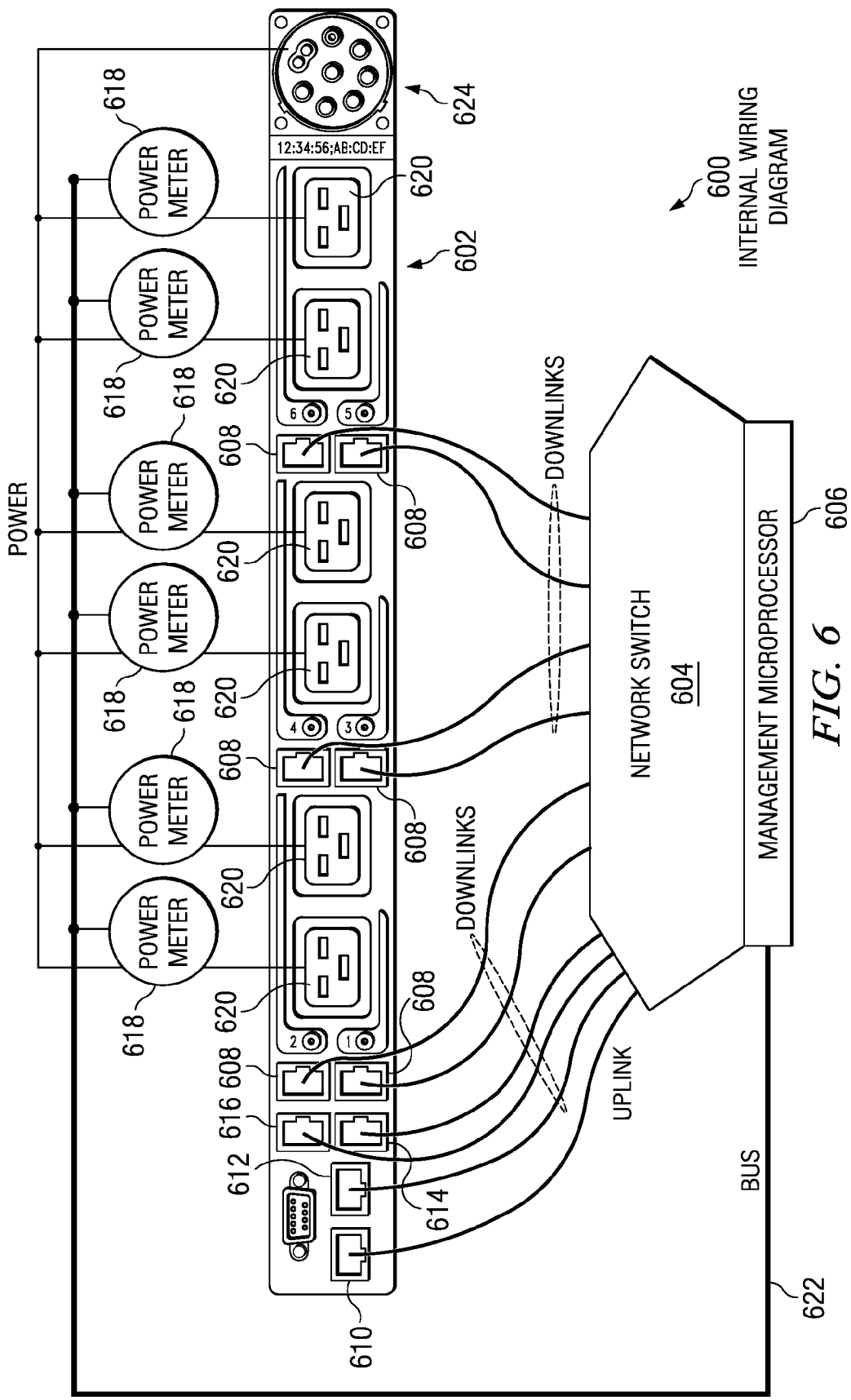
FIG. 6 is an exemplary internal wiring diagram for a power network distribution unit in accordance with an illustrative embodiment.

With reference now to FIG. 6, an exemplary internal wiring diagram for a power network distribution unit is depicted in accordance with an illustrative embodiment. Internal wiring diagram 600 shows internal wiring and components for PNDU 602. PNDU 602 may, for example, be PNDU 400 in FIG. 4.

PNDU 602 includes network switch 604 and management microprocessor 606. Network switch 604 provides PNDU 602 with the ability to communicate with a network, such as, for example, network 310 in FIG. 3. Network switch 604 may, for example, be a LAN Ethernet switch. However, illustrative embodiments may utilize any type of network switch to accomplish processes of illustrative embodiments. In addition, network switch 604, or an FPGA in an alternative illustrative embodiments snoops or inspects packets in the network traffic. Inspecting packets is part of the normal operation of network switch 604. Network switch 604 includes a network processor designed for the purpose of snooping packets in the network traffic. Network switch 604 is coupled to network downlink ports 608 and network uplink port 610. In addition, network switch 604 also is coupled to optional redundant PNDU port 612, management chain in port 614, and management chain out port 616.

Management microprocessor 606 provides data processing capabilities for PNDU 602. Management processor 606 is a slow, general purpose microcontroller that reads power meters, gets snooped network addresses from network switch 604 or an FPGA, and communicates with the SMS. For example, management microprocessor 606 may provide data relating to network addresses, such as MAC and IP addresses, for one or more servers that are connected to PNDU 602 by getting the data from network switch 604. Management microprocessor 606 and network switch 604 are coupled together as shown in this example.

PNDU 602 may snoop outbound transmission control protocol (TCP) and user datagram protocol (UDP) traffic and record the MAC address and the IP address found within the outbound packets. PNDU 602 associates the snooped MAC and IP addresses with the corresponding power outlet.

Other methods for associating MAC and IP addresses with a corresponding power outlet may, for example, include PNDU 602 snooping inbound dynamic host configuration protocol (DHCP) packets from a DHCP server. DHCP is a set of rules used by communication devices, such as computers, routers, and network adapters, to allow the communication devices to request and receive an IP address from the DHCP server, which has a list of IP addresses available for assignment. There are 4 DHCP packet types, 2 of which are sent by the DHCP server. Specifically, illustrative embodiments only need to look at a DHCPACK packet. The DHCP server sends the DHCPACK packet to confirm a specific network address that has been given to a particular server. If the MAC address in DHCPACK packet matches the port MAC address, then the PNDU associates the IP address from the DHCPACK packet and the MAC address to the power outlet.

In addition, PNDU 602 may snoop outgoing ARP packets from the server. PNDU 602 records the source MAC and IP addresses from the outgoing ARP packets. An SMS, such as, for example, SMS 304 in FIG. 3, may initiate the ARP by sending a "ping" to a range of IP addresses.

However, PNDU 602 may periodically ARP downlinks to servers for a programmed range of IP addresses or use previously found IP addresses. Then, PNDU 602 listens for responses from the servers associated with the ARPed IP addresses. Thus, PNDU 602 may build an association between IP addresses and power outlets even if a server is not actively sending packets for other purposes.

Further, PNDU 602 may snoop "gratuitous ARP" packets. The gratuitous ARP is broadcast over the regular data network, not the management network. Generally, servers are not aware of the management network for the PNDUs. The data and management networks may be on different LANs with different network masks and with very different IP address ranges.

PNDU 602 may broadcast a claimed IP address to the LAN. Some operating systems do this type of broadcasting when a network link turns on. A fail-over node may claim the IP address of a failed server and perform the "gratuitous ARP" to inform the rest of the server cluster. PNDU 602 removes all associations between the claimed IP address, the packet source MAC address, and an outlet plug if the packet did not originate from the network port associated with the outlet plug.

Furthermore, PNDU 602 may snoop link layer discover protocol (LLDP) packets. LLDP is an emerging standard which provides a solution for the configuration issues caused by expanding LANs. Specifically, LLDP defines a standard method for Ethernet network devices, such as switches, routers, and wireless LAN access points, to advertise information about themselves to other nodes on the network and store the information they discover. LLDP only runs over the data-link layer, which allows two systems running different network layer protocols to learn about each other.

PNDU 602 may use a chassis ID in an LLDP packet to associate related Ethernet ports. If all devices use this protocol, then a redundant port, such as redundant PNDU port 612, on PNDU 602 is not necessary. In this case, PNDU 602 just scans across all PNDUs in a management chain to find associated ports. Alternatively, PNDU 602 may let the SMS perform the association process after the SMS reads all PNDUs in the network and sees the chassis IDs on each Ethernet port.

One PNDU implementation may allow an Ethernet port to be used, even though an associated power outlet is not used, such as, for example, a server that utilizes one power cable and four Ethernet cables. It should be noted that the three Ethernet cables without an associated power cable may have the same chassis ID as the one Ethernet cable associated with the one power cable. In other words, all four Ethernet cables are associated with the same power cable.

Illustrative embodiments may employ a couple of methods to resolve the situation when a server network address is reassigned to another server that is connected to the same PNDU or to a different PNDU. One method is to broadcast "gratuitous ARPs" from the server to which the address is reassigned. PNDUs on the same data network as the server will snoop the "gratuitous ARP" packets. The PNDUs remove all associations or mappings between the reassigned IP address, the packet source MAC address, and an outlet plug unless the packet originated from the network port associated with the outlet plug.

Another method is for the SMS to catch and correct the reassigned network address to another PNDU. The SMS sees the network address as previously associated with the old PNDU. The SMS eventually accepts the new network address and discards mapping for the older address. Then, the SMS tells the old PNDU to clear its mapping as well.

If network address associations frequently change, then the SMS may warn a system administrator that the network is incorrectly configured (e.g., two servers are using the same static network address) and locate the servers via their respective PNDU power outlet. Servers that crash (e.g., do not respond to a "ping" or fail a heartbeat algorithm) may be identified and remotely powered off or restarted.

In addition, management microprocessor 606 also may provide data relating to power consumption of the one or more servers connected to PNDU 602. Management microprocessor 606 is coupled to power meters 618 via bus 622. Bus 622 may, for example, be an I²C bus. Power socket 624 provides PNDU 602 with the ability to receive power from an external circuit or source, such as power supply 308 in FIG. 3.

Power meters 618 are meters that measure the power output of power outlets 620. It should be noted that each power outlet 620 has its own power meter 618. Consequently, management microprocessor 606 may determine the power consumption of each server connected to PNDU 602 via power outlets 620. Moreover, management microprocessor 606 may provide data associating the network addresses to the power consumption of the one or more servers connected to PNDU 602.

Figure 7:
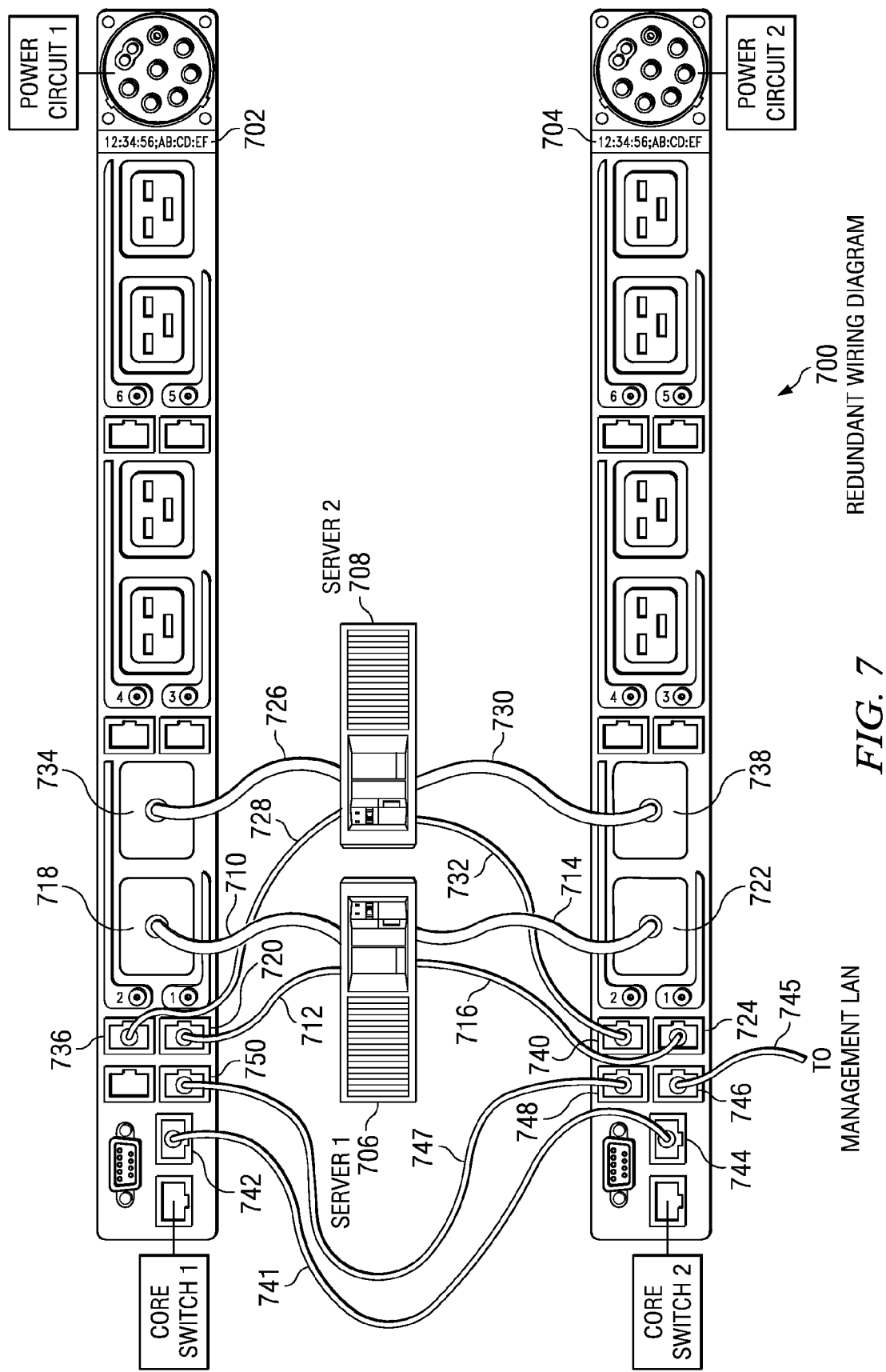
FIG. 7 is an exemplary redundant wiring diagram for a power network distribution unit in accordance with an illustrative embodiment.

With reference now to FIG. 7, an exemplary redundant wiring diagram for a power network distribution unit is depicted in accordance with an illustrative embodiment. A system designer may wire two PNDUs together for servers that require a redundant power supply and network access. The redundant PNDUs communicate their MAC address over a redundant port, such as, for example, redundant PNDU port 412 in FIG. 4, to discover each other. Each server requiring redundant power supply and network access plugs into a same numbered port/outlet on both of the redundant PNDUs. However, an SMS may program the PNDUs to use other groupings of outlets/ports, if desired. The PNDUs and/or the SMS sums the power output of the two power outlets together and associates the power output to all network addresses seen on either network port.

Redundant wiring diagram 700 shows external wiring for two redundant PNDUs. Redundant wiring diagram 700 includes PNDU 702 and PNDU 704. Both PNDU 702 and PNDU 704 may, for example, be PNDU 400 in FIG. 4.

Redundant wiring diagram 700 also includes server 706 and server 708. Server 706 and server 708 may, for example, be server 104 and server 106 in FIG. 1. In addition, server 706 and server 708 may, for example, be servers within a server rack, such as server rack 306 in FIG. 3. Server 706 and server 708 require redundant power and network sources.

Server 706 connects to PNDU 702 via power cable 710 and network cable 712 and to PNDU 704 via power cable 714 and network cable 716. Power cable 710 inserts into power outlet 718 and network cable 712 inserts into network port 720. Similarly, power cable 714 inserts into power outlet 722 and network cable 716 inserts into network port 724. It should be noted that power outlet 718 and network port 720 on PNDU 702 and power outlet 722 and network port 724 on PNDU 704 all have the same corresponding port/outlet number, which is "1."

Server 708 connects to PNDU 702 via power cable 726 and network cable 728 and to PNDU 704 via power cable 730 and network cable 732. Power cable 726 inserts into power outlet 734 and network cable 728 inserts into network port 736. Similarly, power cable 730 inserts into power outlet 738 and network cable 732 inserts into network port 740. It should be noted that power outlet 734 and network port 736 on PNDU 702 and power outlet 738 and network port 740 on PNDU 704 all have the same corresponding port/outlet number, which is "2."

Further, PNDU 702 connects with redundant PNDU 704 via redundant cable 741. Redundant cable 741 is inserted in redundant PNDU port 742 and redundant PNDU port 744. Furthermore, chain cable 745 is inserted in management chain in port 746 to provide PNDU chain management capabilities. Also, chain cable 747 connects PNDU 704 and PNDU 702 into the PNDU chain via management chain out port 748 and management chain in port 750, respectively. The management chain may connect a plurality of PNDUs, such as, for example, in a rack, to signify to an SMS that these connected PNDUs are located together and are managed as one unit.

Figure 8:
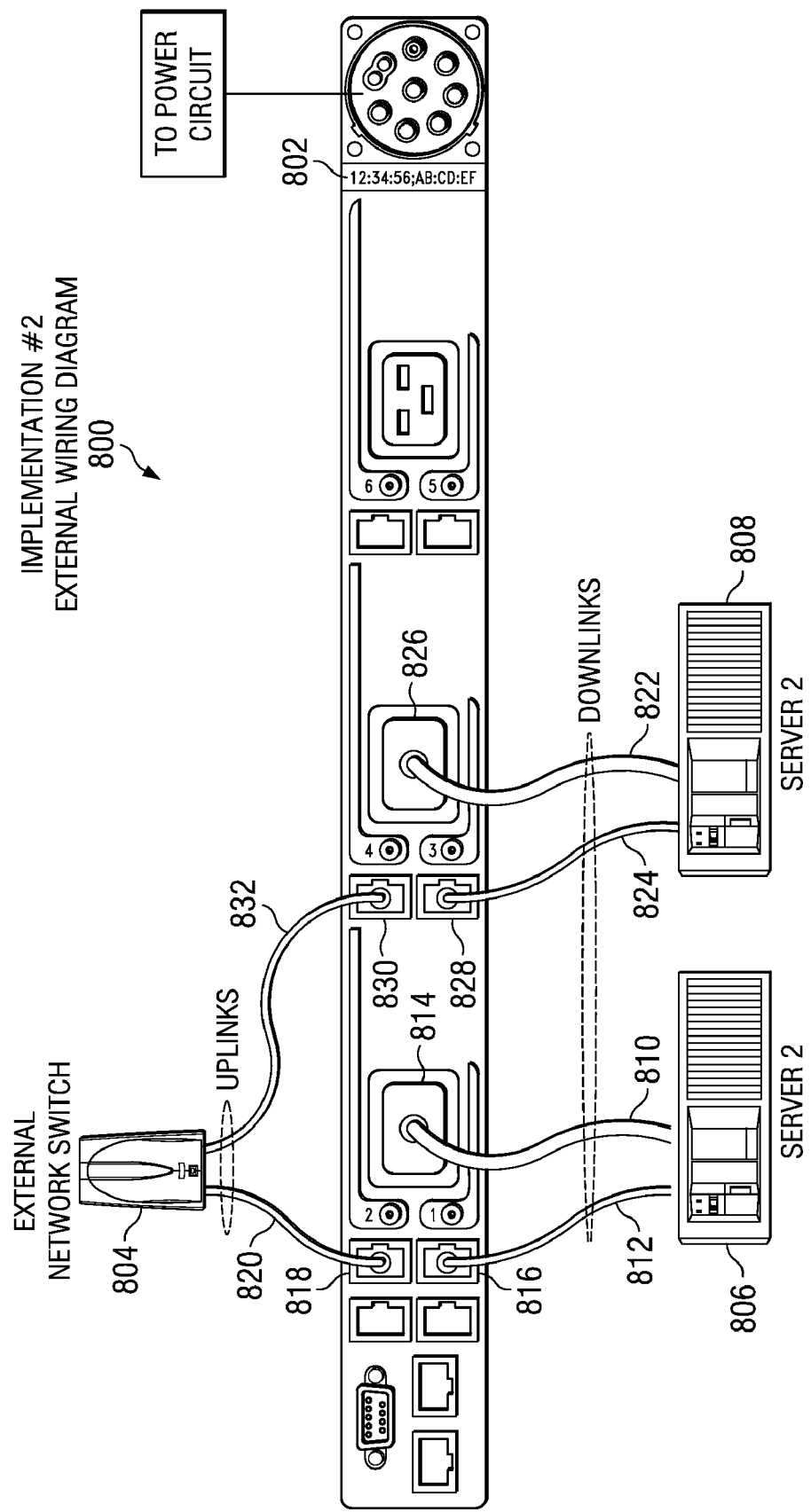
FIG. 8 is an exemplary external wiring diagram for a power network distribution unit without an internal network switch in accordance with an illustrative embodiment.

With reference now to FIG. 8, an exemplary external wiring diagram for a power network distribution unit without an internal network switch is depicted in accordance with an illustrative embodiment. FIG. 8 depicts an alternative illustrative embodiment. In this alternative embodiment, the network switch is not contained within the PNDU as previously illustrated in FIG. 6.

FIG. 8 modifies FIG. 6 by removing network switch 604 from the PNDU and replacing this single high-speed uplink with a pair of network ports in the PNDU for each power outlet. One network port goes to a core network switch for the uplink and the other network port goes to a server for the downlink.

Internally, the PNDU snoops outbound traffic for network address association. The PNDU may, for example, use an FPGA to internally snoop the network traffic. This alternative illustrative embodiment is for a customer that may desire to use an external switch as opposed to a built-in internal switch. Although this alternative illustrative embodiment may be less expensive to build, implementation requires more cables to be used. Also, it should be noted that the FPGA may snoop both inbound and outbound traffic just like a PNDU that utilizes an internal network switch. In addition, the FPGA may snoop both DHCP and LLDP network traffic.

External wiring diagram 800 includes PNDU 802, external network switch 804, server 806, and server 808. Server 806 connects to PNDU 802 via power cable 810 and network cable 812. Power cable 810 inserts into power outlet 814 and network cable 812 inserts into network port 816. Power outlet 814 is associated with network port 816 and network port 818. Network port 816 provides the downlink for server 806 and network port 818 provides the uplink to external network switch 804. External network switch 804 connects to network port 818 via network cable 820.

Similarly, server 808 connects to PNDU 802 via power cable 822 and network cable 824. Power cable 822 inserts into power outlet 826 and network cable 824 inserts into network port 828. Power outlet 826 is associated with network port 828 and network port 830. Network port 828 provides the downlink for server 808, while network port 830 provides the uplink to external network switch 804. External network switch 804 connects to network port 830 via network cable 832. As a result, PNDU 802 acts as a network pass-through for servers 806 and 808 to external network switch 804.

Figure 9:
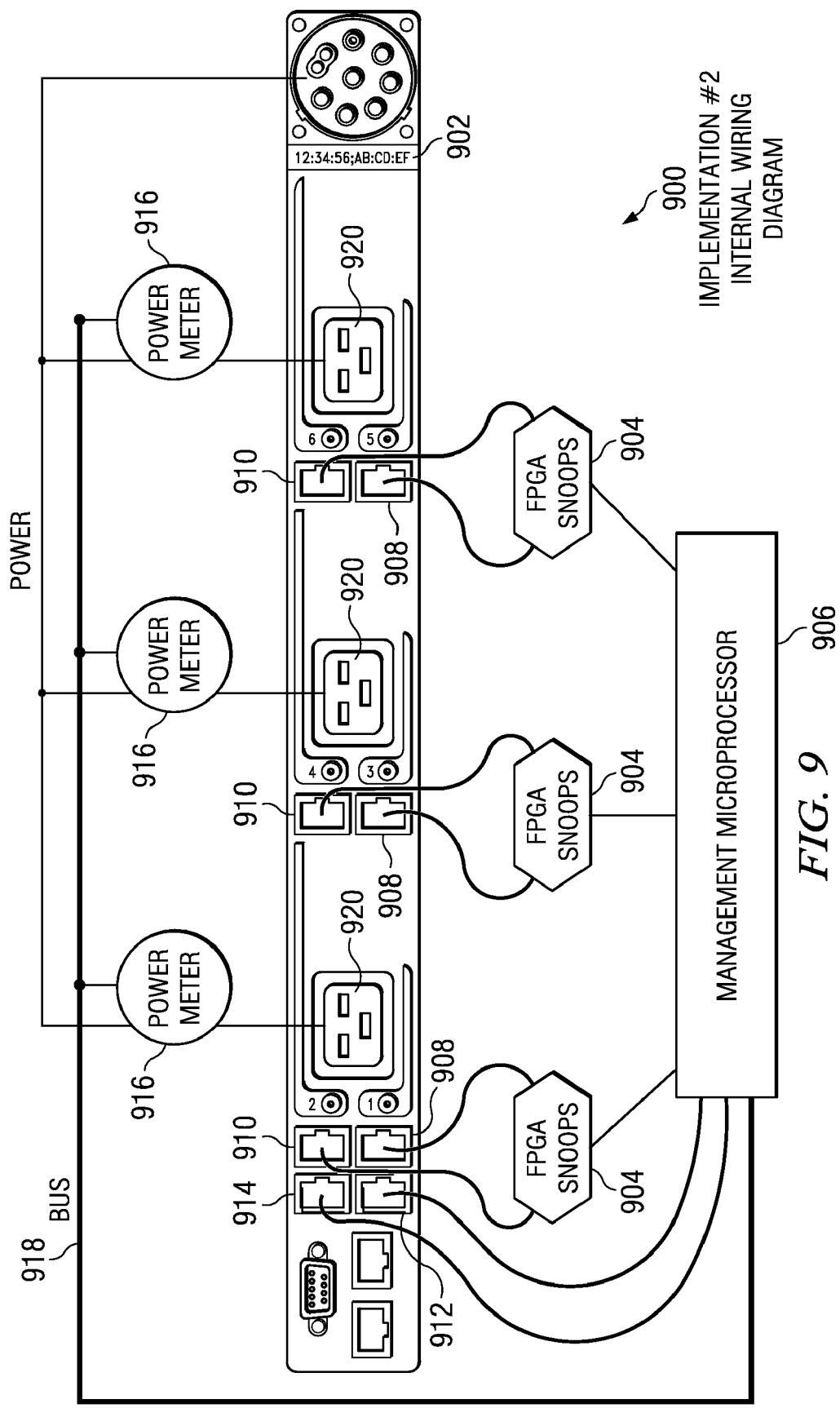
FIG. 9 is an exemplary internal wiring diagram for a power network distribution unit without an internal network switch in accordance with an illustrative embodiment.

With reference now to FIG. 9, an exemplary internal wiring diagram for a power network distribution unit without an internal network switch is depicted in accordance with an illustrative embodiment. FIG. 9 illustrates internal wiring for the alternative embodiment shown in FIG. 8. Internal wiring diagram 900 shows the internal wiring and components for PNDU 902. PNDU 902 may, for example, be PNDU 802 in FIG. 8.

PNDU 902 includes FPGAs 904 and management microprocessor 906. FPGAs 904 provide PNDU 902 with the ability to internally snoop network traffic to determine and record network addresses of connected servers. FPGAs 904 are connected to network downlink ports 908, such as, for example, network ports 816 and 828 in FIG. 8, and network uplink ports 910, such as, for example, network ports 818 and 830 in FIG. 8.

Management microprocessor 906 may, for example, be management microprocessor 606 in FIG. 6. Management microprocessor 906 provides data processing capabilities for PNDU 902. Management microprocessor 906 is connected to FPGAs 904, management chain in port 912, and management chain out port 914.

In addition, management microprocessor 906 also is connected to power meters 916 via bus 918. Power meters 916 provide management microprocessor 906 with data relating to power consumption of one or more servers connected to PNDU 902 via power outlets 920.

With reference now to FIG. 10, an exemplary illustration of data tables is depicted in accordance with an illustrative embodiment. Data tables 1000 are produced by processes of illustrative embodiments. Data tables 1000 include PNDU data table 1002, PNDU data table 1004, and SMS data table 1006.

PNDUs, such as, for example, PNDUs 702 and 704 in FIG. 7, create PNDU data table 1002 and PNDU data table 1004, respectively. For each power outlet, the PNDUs may, for example, record power, accumulated energy, and the like. In addition, the PNDUs may list MAC addresses seen and IP addresses for each MAC address. The lists may include the most recently seen items, such as ten IP addresses (e.g. guest operating systems on a hypervisor). Further, the PNDUs may list a network address of a redundant PNDU, if connected, a network address of each PNDU in a management chain, and a network address of a head PNDU.

PNDU tables 1002 and 1004 include column headers, such as power outlet number 1008, energy used 1010, power 1012, MAC address 1014, IP address 1016, and data age 1018. Power outlet number 1008 provides the number associated with each power outlet in a PNDU. Energy used 1010 provides the number of kilowatt-hours (kWh) used by the power outlet. Power 1012 provides the number of Watts (W) presently used by the power outlet. MAC address 1014 and IP address 1016 provide the MAC and IP addresses of one or more servers associated with the power outlets. Data age 1018 provides the amount of time elapsed since the last update for an IP address associated with a power outlet.

Power outlet "#1" 1020 in PNDU data table 1002 may, for example, represent power outlet 718 in PNDU 702 in FIG. 7. Also, power outlet "#2" 1022 in PNDU data table 1002 may, for example, represent power outlet 734 in PNDU 702 in FIG. 7. Similarly, power outlet "#1" 1024 in PNDU data table 1004 may, for example, represent power outlet 722 in PNDU 704 in FIG. 7. In this example, power outlet "#2" 1026 in PNDU data table 1004 is shown as not being connected to any server.

In this example, a server, such as, for example, server 706 in FIG. 7, is represented by the data contained in the row for power outlet "#1" 1020 within PNDU data table 1002. Consequently, the server connected to power outlet "#1" 1020 used 30000 kWh of energy and 400 W of power. Also in this example, a second server, such as, for example, server 708 in FIG. 7, is represented by the data contained in the row for power outlet "#2" 1022. As a result, the second server connected to power outlet "#2" 1022 has used 50000 kWh of energy and 300 W of power.

Further in this example, the server connected to power outlet "#1" 1020 in PNDU data table 1002 is also connected to power outlet "#1" 1024 in PNDU data table 1004. For example, server 706 is connected to power outlet 718 in PNDU 702 via power cable 710 and to power outlet 722 in PNDU 704 via power cable 714 in FIG. 7. This same server, which is connected to the second PNDU represented by power outlet "#1" 1024, has used 31000 kWh of energy and 410 W of power. It Should be noted that in both PNDU data table 1002 and PNDU data table 1004, MAC address 1014 and IP address 1016 are associated with the appropriate power outlet number 1008.

An SMS, such as, for example, SMS 304 in FIG. 3, creates SMS data table 1006. The SMS creates SMS data table 1006 by fetching the data contained in PNDU data table 1002 and PNDU data table 1004 from the respective PNDUs. Then, the SMS aggregates the data fetched from the PNDUs. For example, besides including column headers 1008, 1010, 1012, 1014, 1016, and 1018 contained in PNDU data tables 1002 and 1004, SMS data table 1006 also includes column headers aggregate energy used 1028 and aggregate power 1030. Aggregate energy used 1028 provides the aggregate number of kWh used by a server connected to power outlets with the same number. Aggregate power 1030 provides the aggregate number of W used by a server connected to power outlets with the same number.

In this example, server "#1" 1032, which is connected to power outlet "#1" 1020 in PNDU "#1" and power outlet "#1" 1024 in PNDU "#2," used 61000 kWh of aggregate energy and 810 W of aggregate power. This aggregated energy and power data is produced by summing the energy and power of power outlets "#1" 1020 and 1024. The SMS displays SMS data table 1006 in, for example, a graphical user interface for a user to review. The user may query the SMS for a specific IP address, such as IP address 1034, and be shown an entry from SMS data table 1006. For example, the user may specify the IP address 9.3.61.100 in the SMS query and be shown the power consumption (50000 kWh) and the energy consumption (300 W) associated with IP address 9.3.61.100. In addition, the SMS updates SMS data table 1006 on a pre-determined time interval basis or as needed by the user.

Figure 11:
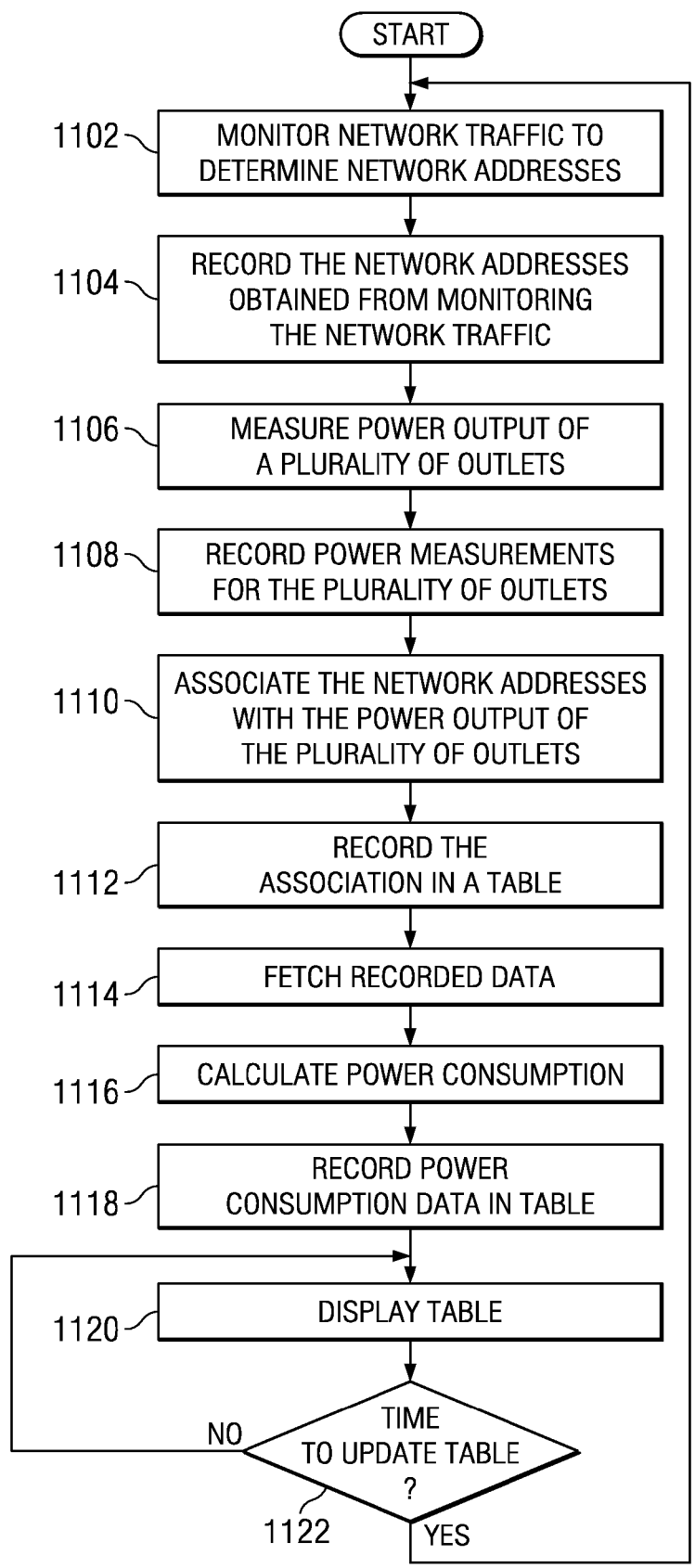
FIG. 11 is a flowchart illustrating an exemplary process for associating power consumption with one or more network addresses in accordance with an illustrative embodiment.

With reference now to FIG. 11, a flowchart illustrating an exemplary process for associating power consumption with one or more network addresses is shown in accordance with an illustrative embodiment. The process shown in FIG. 11 may be implemented in a power and network distribution system, such as, power and network distribution system 300 in FIG. 3.

The process begins when the power and network distribution system uses a PNDU, such as, for example, PNDU 302 in FIG. 3, to monitor network traffic to determine one or more network addresses for one or more servers in a server rack, such as, for example, server rack 306 in FIG. 3 (step 1102). Afterward, the PNDU records the one or more network addresses obtained from monitoring the network traffic (step 1104). Then, the PNDU measures the power output of one or more power outlets in the PNDU (step 1106). Subsequently, the PNDU records the power measurements for the one or more power outlets in the PNDU (step 1108). However, it should be noted that the PNDU may perform steps 1102 and 1104 subsequent to, or concurrent with, steps 1106 and 1108.

After performing steps 1102, 1104, 1106, and 1108, the PNDU associates the one or more network addresses with the power output measurements of the one or more power outlets (step 1110). Subsequent to associating the one or more network addresses with the power output measurements of the one or more power outlets in step 1110, the PNDU records the associations and their respective data in a table, such as, for example, PNDU data tables 1002 and 1004 in FIG. 10 (step 1112). Then, the power and network distribution system uses a SMS, such as, for example, SMS 304 in FIG. 3, to fetch the recorded data from the PNDU (step 1114).

After fetching the recorded data from the PNDU in step 1114, the SMS calculates total power consumption by each of the one or more servers in the server rack (step 1116). Subsequently, the SMS records the power consumption calculation data in a table, such as, for example, SMS data table 1006 in FIG. 10 (step 1118). Then, the SMS displays the SMS data table in a display device for a user to review (step 1120).

After displaying the SMS data table in step 1120, the SMS makes a determination as to whether it is time to update the SMS data table (step 1122). The SMS determines that it is time to update the SMS data table on a pre-determined time interval basis. The time interval may, for example, be every one minute, ten minutes, thirty minutes, one hour, or twenty-four hours. If it is not time to update the SMS data table, no output of step 1122, the process returns to step 1120. If it is time to update the SMS data table, yes output of step 1122, the process returns to step 1102. However, it should be noted that even though the SMS waits until it is time to update the SMS data table at step 1122, the power and network distribution system continues to perform the processes of monitoring power consumption, snooping network traffic, fetching recorded PNDU data, and displaying SMS data. Further, it should be noted that the power and network distribution system may perform each of these processes concurrently.

Figure 12:
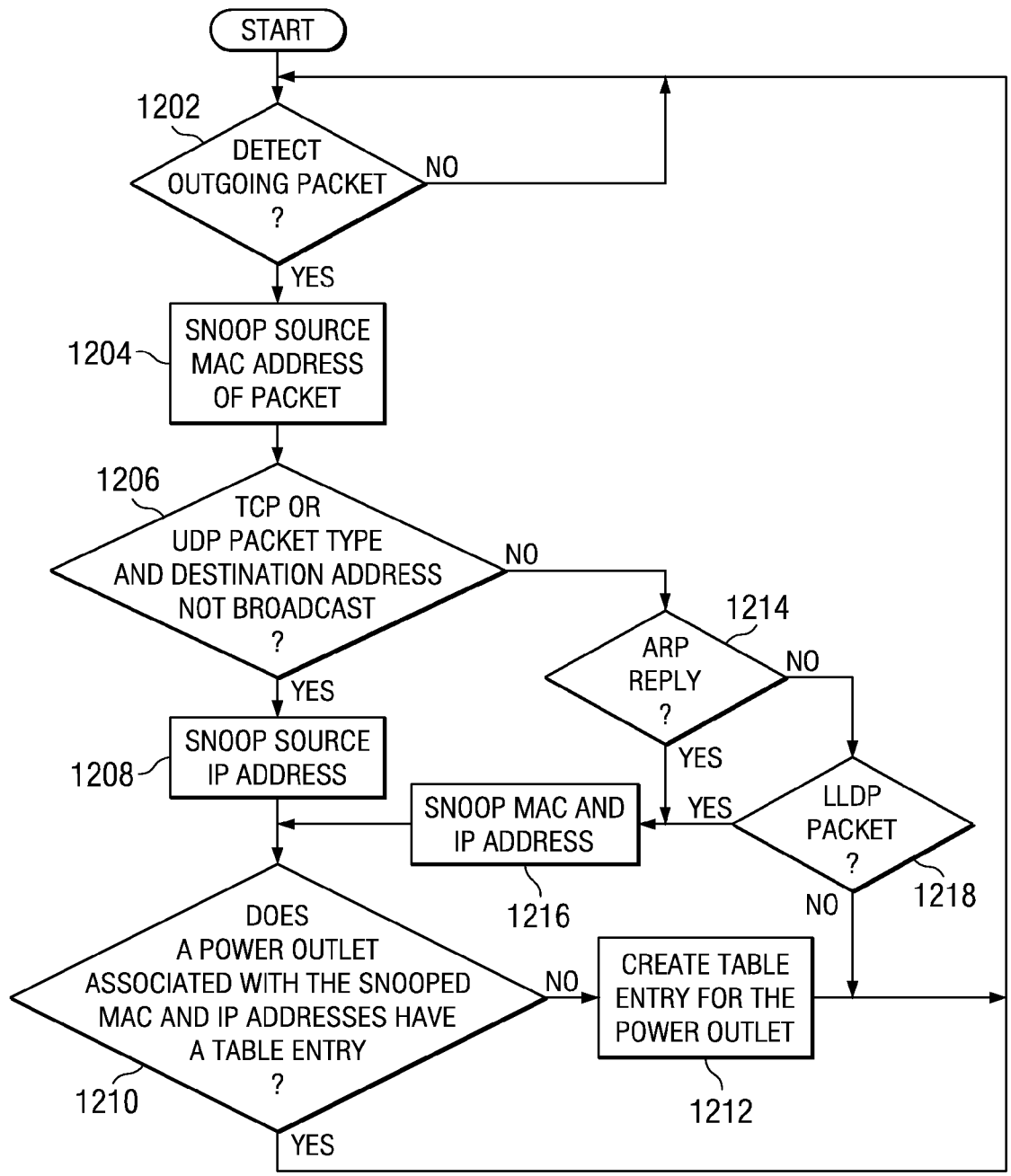
FIG. 12 is a flowchart illustrating an exemplary process for monitoring outgoing network packets from a server in accordance with an illustrative embodiment.

With reference now to FIG. 12, a flowchart illustrating an exemplary process for monitoring outgoing network packets from a server is shown in accordance with an illustrative embodiment. The process shown in FIG. 12 may be implemented in a PNDU, such as, for example, PNDU 502 in FIG. 5.

The process begins when the PNDU uses a network switch, such as, for example, network switch 604 in FIG. 6, to make a determination as to whether the network switch detects an outgoing packet from a server, such as, for example, server 504 in FIG. 5 (step 1202). If the network switch does not detect an outgoing packet, no output of step 1202, the process returns to step 1202 where the network switch waits for an outgoing packet. If the network switch does detect an outgoing packet, yes output of step 1202, then the network switch snoops a source MAC address from the outgoing packet (step 1204).

Subsequent to snooping the source MAC address from the outgoing packet in step 1204, the network switch makes a determination as to whether a TCP or UDP packet type and destination address was not broadcast (step 1206). If the TCP or UDP packet type and destination address was not broadcast, yes output of step 1206, then the network switch snoops a source IP address from the outgoing packet (step 1208). After the network switch snoops the source IP address from the outgoing packet in step 1208, the PNDU uses a management microprocessor, such as, for example, management microprocessor 606 in FIG. 6, to make a determination as to whether a power outlet, such as, for example, power outlet 510 in FIG. 5, which is associated with the snooped source MAC and IP addresses, has an entry in a PNDU data table, such as, for example, PNDU data table 1002 in FIG. 10 (step 1210).

If the power outlet associated with the snooped source MAC and IP addresses does have an entry in the PNDU data table, yes output of step 1210, then the process returns to step 1202 where the network switch waits for an outgoing packet. If the power outlet associated with the snooped source MAC and IP addresses does not have an entry in the PNDU data table, no output of step 1210, then the management microprocessor creates an entry in the PNDU data table for the power outlet associated with the snooped source MAC and IP addresses. Thereafter the process returns to step 1202.

Returning again to step 1206, if the TCP or UDP packet type and destination address was broadcast, no output of step 1206, then the network switch makes a determination as to whether the outgoing packet was an ARP reply (step 1214). If the outgoing packet was an ARP reply, yes output of step 1214, then the network switch snoops the MAC and IP addresses from the ARP reply (step 1216). Thereafter, the process returns to step 1210 where the management microprocessor makes a determination as to whether a power outlet associated with the snooped MAC and IP addresses has an entry in the PNDU data table.

Returning again to step 1214, if the outgoing packet was not an ARP reply, no output of step 1214, then the network switch makes a determination as to whether the outgoing packet was an LLDP packet (step 1218). If the outgoing packet was an LLDP packet, yes output of step 1218, then the process returns to step 1216, where the network switch snoops the MAC and IP addresses from the LLPD packet. If the outgoing packet was not an LLDP packet, no output of step 1218, then the process returns to step 1202 where the network switch waits for an outgoing packet.

It should be noted that the ARP and LLDP packets have data fields for the snooped MAC and IP addresses that are different from typical TCP and UDP traffic. These data fields in the ARP and LLDP packets are in different locations. Also, these data fields in the ARP and LLDP packets are not used to route the packets.

Figure 13:
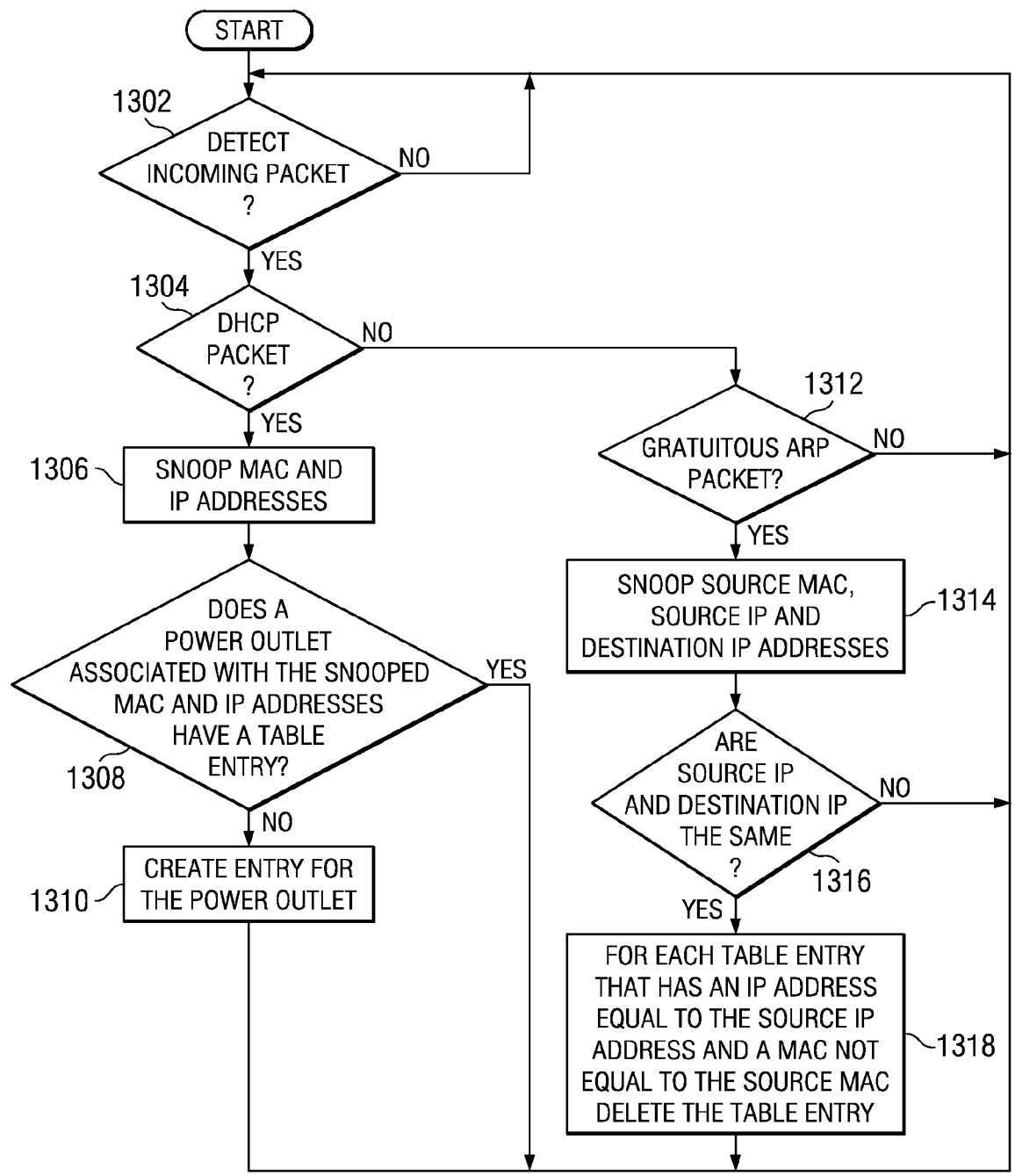
FIG. 13 is a flowchart illustrating an exemplary process for monitoring incoming network packets to a server in accordance with an illustrative embodiment.

With reference now to FIG. 13, a flowchart illustrating an exemplary process for monitoring incoming network packets to a server is shown in accordance with an illustrative embodiment. The process shown in FIG. 13 may be implemented in a PNDU, such as, for example, PNDU 502 in FIG. 5.

The process begins when the PNDU uses a network switch, such as, for example, network switch 604 in FIG. 6, to make a determination as to whether the network switch detects an incoming packet from a server, such as, for example, server 504 in FIG. 5 (step 1302). If the network switch does not detect an incoming packet, no output of step 1302, the process returns to step 1302 where the network switch waits for an incoming packet. If the network switch does detect an incoming packet, yes output of step 1302, then the network switch makes a determination as to whether the incoming packet is a DHCP packet (step 1304). It should be noted that illustrative embodiments are concerned with DHCPACK packet types here because only this type of DHCP packet in the DHCP protocol confirms the assignment of an IP address to a particular server.

If the incoming packet is a DHCP packet, yes output of step 1304, then the network switch snoops a MAC and an IP address from the incoming DHCP packet (step 1306). Subsequent to the network switch snooping the MAC and IP addresses from the incoming DHCP packet in step 1306, the PNDU uses a management microprocessor, such as, for example, management microprocessor 606 in FIG. 6, to make a determination as to whether a power outlet, such as, for example, power outlet 510 in FIG. 5, which is associated with the snooped MAC and IP addresses, has an entry in a PNDU data table, such as, for example, PNDU data table 1002 in FIG. 10 (step 1308).

If the power outlet associated with the snooped MAC and IP addresses does have an entry in the PNDU data table, yes output of step 1308, then the process returns to step 1302 where the network switch waits for an incoming packet. If the power outlet associated with the snooped MAC and IP addresses does not have an entry in the PNDU data table, no output of step 1308, then the management microprocessor creates an entry in the PNDU data table for the power outlet associated with the snooped MAC and IP addresses. Thereafter the process returns to step 1302.

Returning again to step 1304, if the incoming packet is not a DHCP packet, no output of step 1304, then the network switch makes a determination as to whether the incoming packet is a "gratuitous ARP" packet (step 1312). If the incoming packet is not a gratuitous ARP packet, no output of step 1312, then the process returns to step 1302 where the network switch waits for an incoming packet. If the incoming packet is a gratuitous ARP packet, yes output of step 1312, then the network switch snoops source MAC and IP addresses, as well as, a destination IP address from the gratuitous ARP packet (step 1314).

After the network switch snoops the source MAC and IP addresses and the destination IP address from the gratuitous ARP packet in step 1314, the management microprocessor makes a determination as to whether the snooped source and destination IP addresses are the same (step 1316). If the snooped source and destination IP addresses are not the same, no output of step 1316, then the process returns to step 1302 where the network switch waits for an incoming packet. If the snooped source and destination IP addresses are the same, yes output of step 1316, then the management microprocessor deletes each entry in the PNDU table that has an IP address equal to the snooped source IP address and a MAC address not equal to the snooped source MAC address (step 1318). Thereafter, the process returns to step 1302 where the network switch waits for an incoming packet.

Figure 14:
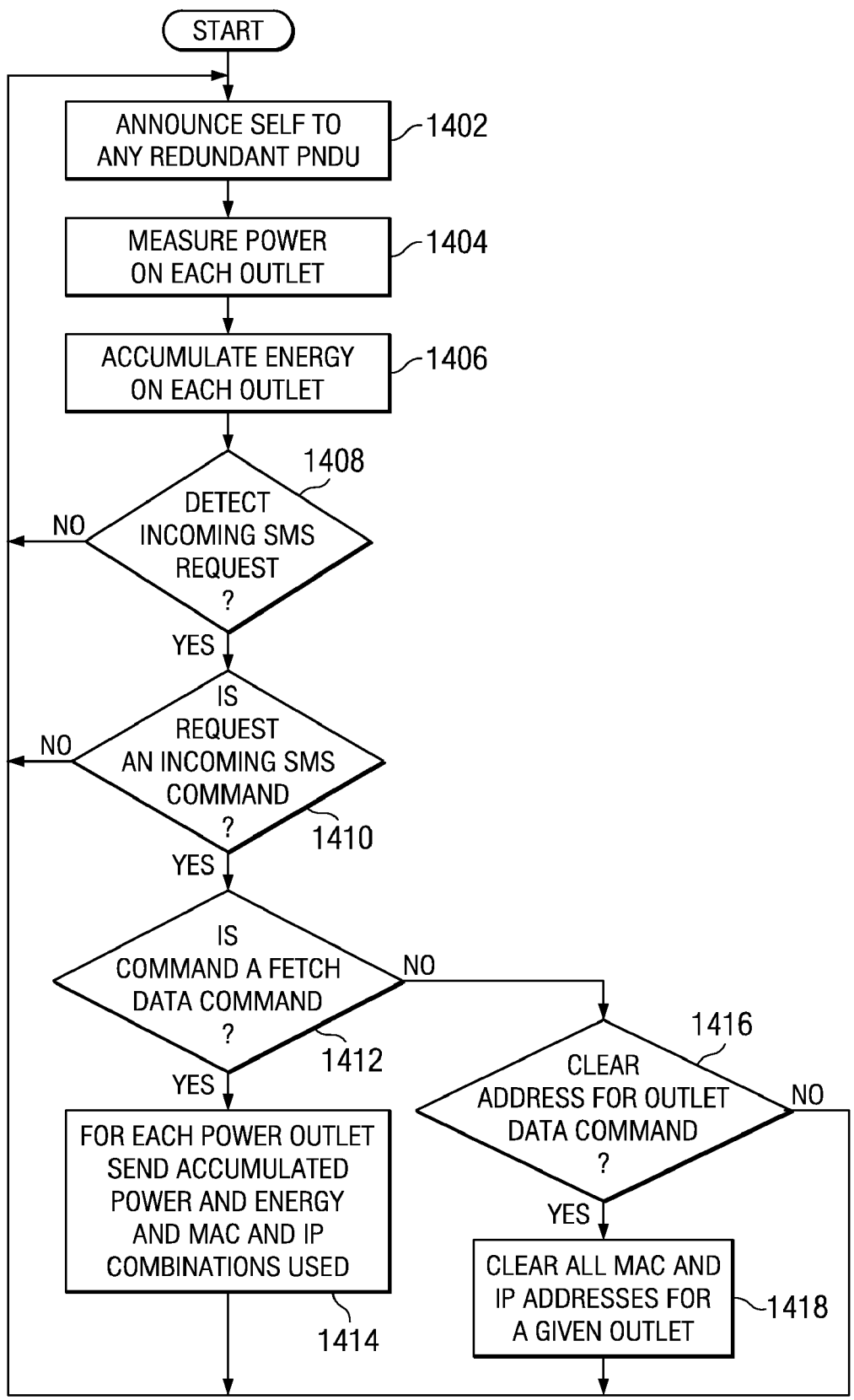
FIG. 14 is a flowchart illustrating an exemplary process for performing commands from system management software to a power network distribution unit in accordance with an illustrative embodiment.

With reference now to FIG. 14, a flowchart illustrating an exemplary process for performing commands from system management software to a power network distribution unit is shown in accordance with an illustrative embodiment. The process shown in FIG. 14 may be implemented in a PNDU, such as, for example, PNDU 702 in FIG. 7.

The process begins when the PNDU announces itself to any redundant PNDU, such as, for example, redundant PNDU 704 in FIG. 7 (step 1402). Then, the PNDU uses power meters, such as, for example, power meters 618 in FIG. 6, to measure power output on each power outlet, such as, for example, power outlets 620 in FIG. 6, in the PNDU (step 1404). Subsequent to measuring the power output on each power outlet in the PNDU in step 1404, the PNDU utilizes a management microprocessor, such as, for example, management microprocessor 606 in FIG. 6, to accumulate, or aggregate, the energy on each power outlet (step 1406).

Afterward, the management microprocessor makes a determination as to whether the management microprocessor detects an incoming request from an SMS, such as, for example, SMS 304 in FIG. 3 (step 1408). If the management microprocessor does not detect an incoming request from the SMS, no output of step 1408, then the process returns to step 1402. If the management microprocessor does detect an incoming request from the SMS, yes output of step 1408, then the management microprocessor makes a determination as to whether the incoming SMS request is an SMS command (step 1410).

If the incoming SMS request is not an SMS command, no output of step 1410, then the process returns to step 1402. If the incoming SMS request is an SMS command, yes output of step 1410, then the management microprocessor makes a determination as to whether the incoming SMS command is a fetch data command (step 1412). If the incoming SMS command is a fetch data command, yes output of step 1412, then the management microprocessor sends accumulated power and energy data for each power outlet in the PNDU, along with MAC and IP address combinations used for each associated power outlet, to the SMS (step 1414). Thereafter, the process returns to step 1402.

Returning again to step 1412, if the incoming SMS command is not a fetch data command, no output of step 1412, then the management microprocessor makes a determination as to whether the incoming SMS command is a clear address for a power outlet data command (step 1416). If the incoming SMS command is not a clear address for a power outlet data command, no output of step 1416, then the process returns to step 1402. If the incoming SMS command is a clear address for a power outlet data command, yes output of step 1416, then the management microprocessor clears all MAC and IP addresses associated with the power outlet designated in the command from a PNDU data table, such as, for example, PNDU data table 1004 in FIG. 10. Thereafter, the process returns to step 1402.

Figure 15:
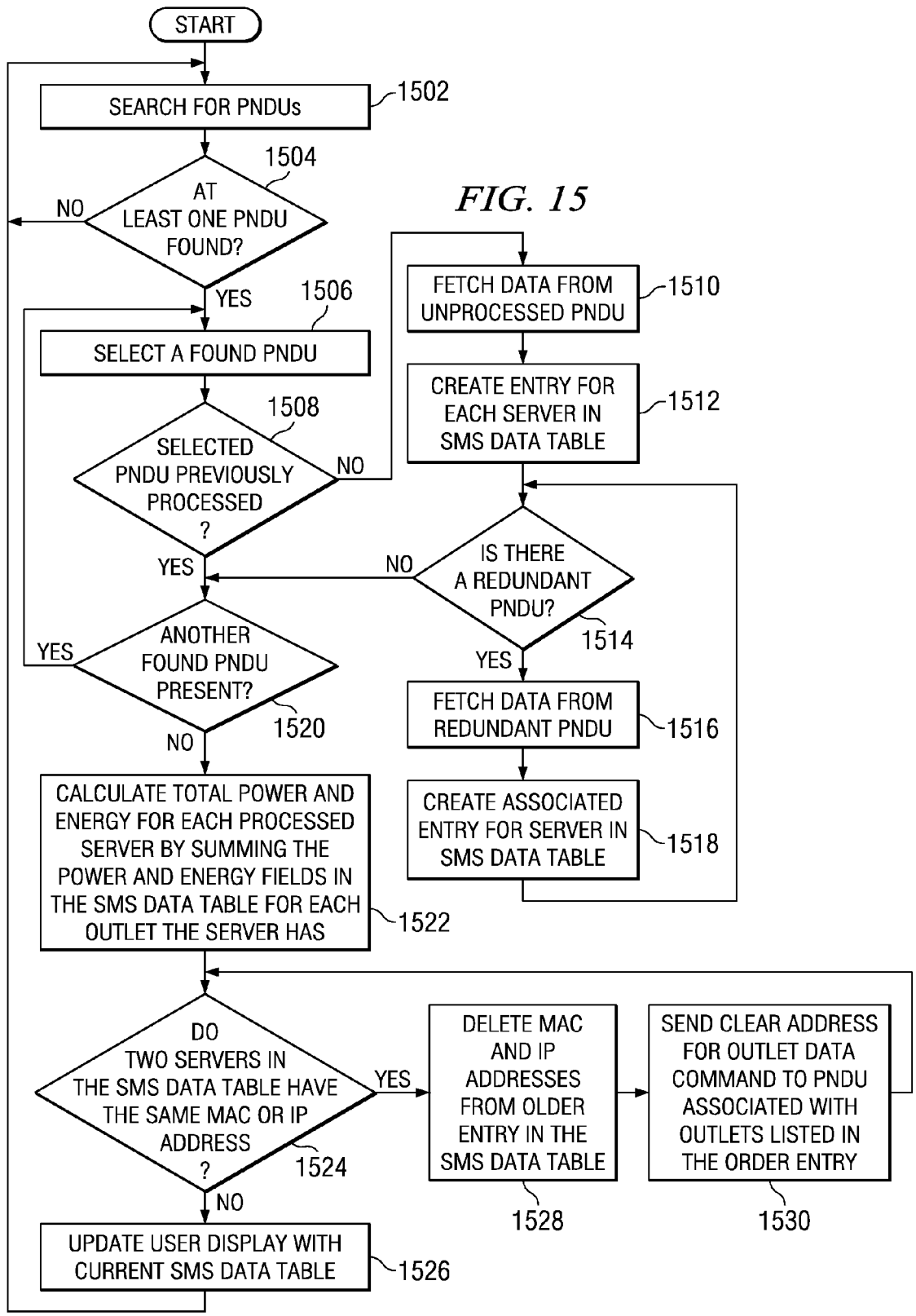
FIG. 15 is a flowchart illustrating an exemplary process for calculating and displaying total power consumption for one or more servers by system management software in accordance with an illustrative embodiment.

With reference now to FIG. 15, a flowchart illustrating an exemplary process for calculating and displaying total power consumption for one or more servers by system management software is shown in accordance with an illustrative embodiment. The process shown in FIG. 15 may be implemented in an SMS, such as, for example, SMS 304 in FIG. 3.

The process begins when the SMS searches for any PNDU, such as, for example, PNDU 302 in FIG. 3, that is coupled to a network, such as, for example, network 310 in FIG. 3 (step 1502). After searching for all PNDUs coupled to the network in step 1502, the SMS makes a determination as to whether at least one PNDU was found in the search (step 1504). If at least one PNDU was not found in the search, no output of step 1504, then the process returns to step 1502 where the SMS continues to search for PNDUs coupled to the network.

If at least one PNDU was found in the search, yes output of step 1504, then the SMS selects one of the found PNDUs (step 1506). Subsequent to selecting a PNDU in step 1506, the SMS makes a determination as to whether the selected PNDU was previously processed (step 1508). If the selected PNDU was not previously processed, no output of step 1508, then the SMS fetches data from the unprocessed PNDU (step 1510).

After fetching the data from the unprocessed PNDU in step 1510, the SMS creates an entry in an SMS data table, such as, for example, SMS data table 1006 in FIG. 10, for each server, such as, for example, server 504 and server 506 in FIG. 5, connected to power outlets, such as, for example, power outlets 510 and 518 in FIG. 5, in the unprocessed PNDU (step 1512). Subsequent to creating the entry in the SMS data table for each of the servers connected to the unprocessed PNDU, the SMS makes a determination as to whether the unprocessed PNDU has a redundant PNDU (step 1514).

If the unprocessed PNDU does have a redundant PNDU, yes output of step 1514, then the SMS fetches data from the redundant PNDU (step 1516). After fetching the data from the redundant PNDU in step 1516, the SMS creates an associated entry in the SMS data table for each server connected to power outlets in the redundant PNDU. Subsequent to creating the associated entry in the SMS data table for each of the servers connected to the redundant PNDU, the process returns to step 1514. If the unprocessed PNDU does not have a redundant PNDU, no output of step 1514, then the process proceeds to step 1520.

Returning again to step 1508, if the selected PNDU was previously processed, yes output of step 1508, then the SMS makes a determination as to whether another found PNDU is present (step 1520). If another PNDU is present, yes output of step 1520, then the process returns to step 1506 where the SMS selects another found PNDU. It should be noted that the purpose of steps 1506, 1508, and 1520 are to loop over all the PNDUs and redundant PNDUs connected to the network and process each PNDU exactly once on each major iteration through step 1502. If another PNDU is not present, no output of step 1520, then the SMS calculates the total power and energy consumption for each server by summing power and energy fields in the SMS data table for each associated power outlet connected to a server (step 1522).

Subsequent to calculating the total power and energy consumption for each of the servers in step 1522, the SMS makes a determination as to whether two servers in the SMS data table have a same MAC or IP address (step 1524). If two servers in the SMS data table do not have the same MAC or IP addresses, no output of step 1524, then the SMS updates a user display with the current SMS data table (step 1526). Thereafter, the process returns to step 1502. If two servers in the SMS data table do have the same MAC or IP address, yes output of step 1524, then the SMS deletes the MAC and IP addresses from the older entry in the SMS data table (step 1528). After deleting the MAC and IP addresses from the older entry in the SMS data table in step 1528, the SMS sends a clear address for a power outlet data command to the PNDU associated with the power outlets listed in the older entry in the SMS data table (step 1530). Thereafter, the process returns to step 1524.

Thus, illustrative embodiments provide a computer implemented method, system, and computer usable program code for associating the power consumption of one or more servers with the one or more servers' respective network addresses. First, the system designer connects the PNDUs. Then, the PNDUs determine which PNDUs are in their management chain and a head PNDU is determined for each management chain. The PNDUs note any redundant connections. Servers are turned on. Afterward, the servers DHCP to the network to get IP addresses. When the servers transmit packets, the PNDUs snoop IP and MAC addresses on each network port to associate the network ports with power outlets. The SMS queries the head PNDU for data on all PNDUs in the management chain. Then, the SMS records the associations and power consumption.

The invention may take the form of an entirely hardware embodiment, an entirely software embodiment, or an embodiment containing both hardware and software elements. Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for associating power consumption with a network address, the computer implemented method comprising:
    inspecting by a power network distribution unit connected to an external network switch network traffic internally using a plurality of internal field programmable gate arrays to determine network addresses assigned to one or more servers connected to the power network distribution unit, wherein the plurality of internal field programmable gate arrays inspect the network traffic on a plurality of network ports connected to the one or more servers, and wherein each of the plurality of network ports has a one-to-one correspondence with a same numbered power outlet in a plurality of power outlets on the power network distribution unit;
    measuring by the power network distribution unit a power output of the plurality of power outlets to determine a power consumption of the one or more servers connected to the plurality of power outlets;
    associating by the power network distribution unit the network addresses assigned to the one or more servers with the power consumption of the one or more servers;
    calculating a total power consumption for the one or more servers having an association of network addresses with power consumption;
    recording the total power consumption for the one or more servers in a table; and
    providing a user access to the table.

2. The computer implemented method of claim 1 further comprising:
    fetching data from the power network distribution unit via a network to calculate the total power consumption for the one or more servers.

3. The computer implemented method of claim 1 further comprising:
    updating the table on a pre-determined time interval basis.

4. The computer implemented method of claim 1, wherein the network addresses are a media access control address and an internet protocol address assigned to the one or more servers.

5. The computer implemented method of claim 4, wherein the power network distribution unit inspects the network traffic for the media access control address and the internet protocol address on the plurality of network ports and measures the power output of the plurality of power outlets to determine the power consumption of the one or more servers connected to the plurality of power outlets.

6. The computer implemented method of claim 5, wherein the power network distribution unit is one of a plurality of network distribution units, and wherein each of the plurality of power network distribution units include the plurality of power outlets and the plurality of network ports.

7. The computer implemented method of claim 1, wherein the power network distribution unit connected to the external network switch acts as a network pass-through.

8. The computer implemented method of claim 1, wherein the power network distribution unit is connected to a redundant power network distribution unit, and wherein each of the one or more servers connected to the power network distribution unit and the redundant power network distribution unit are connected via a power cable and a network cable to both the power network distribution unit and the redundant power network distribution unit, and wherein the power cable and the network cable for a server connected to both the power network distribution unit and the redundant power network distribution unit are plugged in to corresponding same numbered power ports and network ports on both the power network distribution unit and the redundant power network distribution unit.

9. The computer implemented method of claim 1, wherein the power network distribution unit includes a plurality of power meters, and wherein the plurality of power meters are associated with the plurality of power outlets, and wherein each of the plurality of power outlets has an associated power meter to measure the power output of each of the plurality of power outlets.

10. The computer implemented method of claim 1, wherein the power network distribution unit includes a management microprocessor.

11. The computer implemented method of claim 1, wherein the power network distribution unit uses a simple external wiring scheme to connect the one or more servers to the power network distribution unit via power cables and network cables plugged in to corresponding same numbered power ports and network ports on the power network distribution unit.

12. The computer implemented method of claim 3, wherein a system management software performs the calculating, recording, displaying, fetching, and updating steps.

13. The computer implemented method of claim 12, wherein the system management software scans the network to find one or more power network distribution units connected to a network.

14. The computer implemented method of claim 12, wherein the system management software utilizes a graphical user interface window to display the network addresses assigned to the one or more servers and a corresponding power consumption used by the one or more servers.

15. The computer implemented method of claim 14, wherein the user may query the system management software by using a particular network address to locate a particular server and view the corresponding power consumption used by that particular server in the graphical user interface window.

16. The computer implemented method of claim 15, wherein the user may query the system management software by using the particular network address in the graphical user interface window to locate each power network distribution unit and each power outlet used for the particular server.

17. A data processing system for associating power consumption with a network address, comprising:

a bus system;

a storage device connected to the bus system, wherein the storage device includes a set of instructions; and a processing unit connected to the bus system, wherein the processing unit executes the set of instructions to inspect by a power network distribution unit connected to an external network switch network traffic internally using a plurality of internal field programmable gate arrays to determine network addresses assigned to one or more servers connected to the power network distribution unit, wherein the plurality of internal field programmable gate arrays inspect the network traffic on a plurality of network ports connected to the one or more servers, and wherein each of the plurality of network ports has a one-to-one correspondence with a same numbered power outlet in a plurality of power outlets on the power network distribution unit; measure by the power network distribution unit a power output of the plurality of power outlets to determine a power consumption of the one or more servers connected to the plurality of power outlets; associate by the power network distribution unit the network addresses assigned to the one or more servers with the power consumption of the one or more servers; calculate a total power consumption for the one or more servers having an association of network addresses with power consumption; record the total power consumption of the one or more servers in a table; and provide a user access to the table.

18. A computer program product for associating power consumption with a network address, the computer program product comprising:

a tangible computer readable storage medium having computer usable program code embodied therein, the tangible computer readable storage medium comprising:

computer usable program code configured to inspect by a power network distribution unit connected to an external network switch network traffic internally using a plurality of internal field programmable gate arrays to determine network addresses assigned to one or more servers connected to the power network distribution unit, wherein the plurality of internal field programmable gate arrays inspect the network traffic on a plurality of network ports connected to the one or more servers, and wherein each of the plurality of network ports has a one-to-one correspondence with a same numbered power outlet in a plurality of power outlets on the power network distribution unit;

computer usable program code configured to measure by the power network distribution unit a power output of the plurality of power outlets to determine a power consumption of the one or more servers connected to the plurality of power outlets;

computer usable program code configured to associate by the power network distribution unit the network addresses assigned to the one or more servers with the power consumption of the one or more servers;

computer usable program code configured to calculate a total power consumption for the one or more servers having an association of network addresses with power consumption;

computer usable program code configured to record the total power consumption for the one or more servers in a table; and computer usable program code configured to provide a user access to the table.

* * * * *